United States Patent
Yamagami (10) Patent No.: US 6,966,488 B2
(45) Date of Patent: Nov. 22, 2005

(54) CARD PAYMENT METHOD FOR SERVICE CHARGE CONCERNING TO PHYSICAL DISTRIBUTION OR TRANSPORTATION

(75) Inventor: Takayuki Yamagami, Kyoto (JP)

(73) Assignee: Sagawa Express Co., Ltd., Kyoto (JP)

( * ) Notice: Subject to any disclaimer, the term of this patent is extended or adjusted under 35 U.S.C. 154(b) by 0 days.

(21) Appl. No.: 10/362,589

(22) PCT Filed: Aug. 23, 2001

(86) PCT No.: PCT/JP01/07225

§ 371 (c)(1),
(2), (4) Date: Feb. 24, 2003

(87) PCT Pub. No.: WO02/17175

PCT Pub. Date: Feb. 28, 2002

(65) Prior Publication Data

US 2003/0183690 A1    Oct. 2, 2003

(30) Foreign Application Priority Data

Aug. 24, 2000  (JP) .............................. 2000-254205

(51) Int. Cl.[7] .............................................. G06K 5/00
(52) U.S. Cl. .................... 235/380; 235/379; 705/53; 379/91.01
(58) Field of Search ................................ 235/379–381, 235/380, 472.01; 705/53; 379/91.01

(56) References Cited

U.S. PATENT DOCUMENTS 4,611,286 A * 9/1986 Nishimura et al. ............ 705/22
4,851,994 A * 7/1989 Toda et al. .................... 710/14
5,208,446 A    5/1993 Martinez
5,336,870 A * 8/1994 Hughes et al. ............... 235/379

(Continued)

FOREIGN PATENT DOCUMENTS

| JP | 5-204956 | 8/1993 |
| JP | 8-181798 | 7/1996 |
| JP | 10-69580 | 3/1998 |
| JP | 10-105614 | 4/1998 |

OTHER PUBLICATIONS

Yuki Inagaki: "Kihon kara jissen made; business seikou no tameno kanpeki guide; how to e-commerce (kakusha haisou system no kikaku bunseki kara saishin service made; haisou service wo kurabete eranda tsukaikonasu)" E-Commerce Super Manual, pp. 56-63, Jun. 23, 2000.

Primary Examiner—Diane I. Lee
Assistant Examiner—Seung H Lee
(74) Attorney, Agent, or Firm—Oblon, Spivak, McClelland, Maier & Neustadt, P.C.

(57) ABSTRACT

A portable card reader 22 reads data from a credit card 20 issued by an account settlement institution, transmits the data for the card and the data for a service charge to the account settlement institution. When the account settlement institution receives from the portable card reader 22 the data for the credit card 20 and the data for the service charge, the account settlement institution issues a credit inquiry for the consumer based on the data received for the credit card and predetermined data for determining the validity of an account settlement card, and settles the service charge based on the result of the credit inquiry obtained by the credit inquiry and the service charge data that is received. Upon receiving the result of the credit inquiry, the portable card reader 22 issues a receipt in accordance with the result of the credit inquiry and the service charge data.

6 Claims, 6 Drawing Sheets

U.S. PATENT DOCUMENTS 5,352,876 A * 10/1994 Watanabe et al. ............ 235/381
5,357,563 A * 10/1994 Hamilton et al. ......... 379/91.01
5,386,106 A *  1/1995 Kumar ....................... 235/380
5,432,326 A *  7/1995 Noblett et al. .............. 235/380
5,637,859 A *  6/1997 Menoud ..................... 235/492
6,295,522 B1 * 9/2001 Boesch ........................ 705/41

* cited by examiner

| NO. | TRANSACTION DATA | CARD DATA | TERMINAL DATA |
|---|---|---|---|
| 1 | INQUIRY NUMBER SERVICE CHARGE SERVICE TYPE | CREDIT COMPANY DATA (CREDIT NUMBER) (CONFIRMATION DATA) | TERMINAL IDENTIFICATION NUMBER |
| | | | |
| | | | |

| NO. | TRANSACTION DATA | CARD DATA | TERMINAL DATA | ACCOUNT DATA |
|---|---|---|---|---|
| 1 | INQUIRY NUMBER<br><br>SERVICE CHARGE<br><br>SERVICE TYPE | CARD COMPANY DATA | TERMINAL IDENTIFICATION INFORMATION | TRANSACTION CONTENTS<br><br>AMOUNT DEPOSITED |
|  |  |  |  |  |

CARD PAYMENT METHOD FOR SERVICE CHARGE CONCERNING TO PHYSICAL DISTRIBUTION OR TRANSPORTATION

TECHNICAL FIELD

The present invention relates to a method for using a card for settling a charge for a distribution or transportation associated service, whereby a charge for a distribution or transportation associated service provided in a consumer can be settled by using a credit or cash card.

BACKGROUND ART

Conventionally, there is an advance payment service with which, when a consumer entrusts baggage to a home delivery dealer for the dispatch of the baggage to a destination using home delivery, the consumer pays the dealer a delivery fee. There is also a charge-on-delivery service with which a delivery charge is paid to a home delivery dealer when baggage is received at the home of the consumer as the destination.

In addition, for shopping performed at an Internet shopping mall on the Internet, for example, a consumer orders from a store at the Internet shopping mall a desired product displayed on the screen of a personal computer.

Then, a selection screen appears for selecting a payment method for the price charged for the product, either a credit or a cash payment settlement. When the consumer desires and elects to use the credit settlement method, a screen appears that instructs the consumer to enter the number of his or her credit card and to designate a home delivery dealer for the delivery of the product.

The consumer then transmits, across a network, a PIN number and the number of a credit card issued by a credit card company or the number of a cash card supplied by a financial institution, which the vender has joined. As a result, the account is settled through the credit card company or the financial institution.

However, for a conventional advance payment service or charge-on-delivery service, a consumer pays a home delivery dealer a delivery charge in cash. Therefore, when the consumer does not have cash and the home delivery dealer does not have change, a settlement cannot be effected.

Furthermore, when shopping at an Internet shopping mall, important personal information, such as a credit card number or a cash card number and a PIN number, must be transmitted to a vender across a network. Therefore the leakage of data is feared.

DISCLOSURE OF THE INVENTION

To overcome the above shortcomings, it is one objective of the present invention to provide a card method for settling a charge for a distribution or transportation associated service, whereby a credit or cash card can be employed to settle a charge for a distribution or transportation associated service that is provided in a consumer, and whereby the leakage of important personal consumer data can be prevented.

The gist of the present invention includes a card settlement method, for settling a charge for a distribution or transportation associated service, by exchanging data through a radio communication line between a portable card reader, carried by a service dealer who provides the service, and an account settlement server provided in an account settlement institution, wherein, to provides the service for the consumer, the portable card reader reads data from an accounting card used by the consumer for payment, transmits the data through the radio communication line to the settlement server, which settles a transaction account, and settles the charge for the service based on result of the credit inquiry obtained for the accounting card that is received from the account settlement server.

Moreover, the gist includes a card settlement method, for settling a charge for a distribution or transportation associated service, by exchanging data through a radio communication line between a portable card reader, carried by a service dealer who provides the service, and an account settlement server provided in an account settlement institution, wherein the portable card reader reads data from an accounting card issued by the account settlement institution, and transmits the data read from the accounting card and data for the service charge through the radio communication line to the account settlement server; the account settlement server receives the data read from the accounting card and the data for the service charge from the portable card reader through the radio communication line, performs a credit inquiry for the consumer based on the data received for the accounting card and predetermined data for determining the validity of the accounting card, settles the service charge based on the result of the credit inquiry that is obtained and the data for the service charge that are received, and transmits the result of the credit inquiry through the radio communication line to the portable card reader; the portable card reader receives the result of the credit inquiry from the account settlement server, through the radio communication line, and issues a receipt based on the result of the credit inquiry and the service charge data.

Moreover, the gist includes the method in which the account settlement server transfers, to an account settlement server at a financial institution that performs an account settlement for the service dealer who provides the service, a value obtained by subtracting a commission required for the settlement from the charge for the service.

Moreover, the gist includes the method in which after obtaining the result of the credit inquiry, the account settlement server deletes the data read from the accounting card that is received from the portable card reader.

Moreover, the gist includes the method in which after obtaining the result of the credit inquiry, the portable card reader deletes the data read from the accounting card of the consumer.

Moreover, the gist includes the method in which the account settlement institution is a credit company or a financial institution, and the accounting card is a credit card issued by the credit company or a debit card issued by the financial institution.

Moreover, the gist includes a card settlement system, for settling a charge associated with a distribution or transportation service by exchanging data through a radio communication line between a portable card reader, carried by a service dealer who provides the service, and an account settlement server provided in an account settlement institution, wherein, to provide the service for the consumer, the portable card reader includes reading means for reading data from an accounting card used by the consumer for payment, and transmission means for transmitting the data through the radio communication line to the account settlement server for settling a transaction charge; wherein the portable card reader receives result of the credit inquiry read from the accounting card from the account settlement server, and settles the charge for the service.

Moreover, the gist includes a card settlement system, for settling a charge for a distribution or transportation associated service by exchanging data through a radio communication line between a portable card reader, carried by a service dealer who provides the service, and an account settlement server provided in an account settlement institution, wherein the portable card reader includes reading means for reading data from an accounting card issued by the account settlement institution, and data transmission means for transmitting the data read from the accounting card and service charge data through the radio communication line to the settling server; the account settlement server includes data reception means for receiving the data read from the accounting card and the service charge data from the portable card reader through the radio communication line, credit inquiry means for performing a credit inquiry for the consumer based on the data received for the accounting card and predetermined data for determining the validity of the accounting card, account settlement means for settling the charge for the service based on the result of the credit inquiry that is obtained and the service charge data that is received, and results transmission means for transmitting the result of the credit inquiry through the radio communication line to the portable card reader; the portable card reader includes results reception means for receiving the result of the credit inquiry from the settling server through the radio communication line, and issuing means for issuing a receipt based on the result of the credit inquiry that is received and the service charge data.

Moreover, the gist includes the system in which the settling server includes transfer means for transferring, to an account settlement server at a financial institution for performing an account settlement for the service dealer who provides the service, a value obtained by subtracting, from the charge for the service, a commission required for the settlement.

Moreover, the gist includes the system in which the account settlement server includes deletion means for, after obtaining the result of the credit inquiry, deleting the data read from the accounting card that is received from the portable card reader.

Moreover, the gist includes the system in which the portable card reader includes deletion means for, after obtaining the result of the credit inquiry, deleting the data read from the accounting card of the consumer.

Moreover, the gist includes the system in which the account settlement institution is a credit card company or a financial institution, and the accounting card is a credit card issued by the credit card company or a debit card issued by the financial institution.

DETAILED DESCRIPTION OF EMBODIMENTS

The present invention will now be described in more detail while referring to the accompanying drawings.

Figure 1:
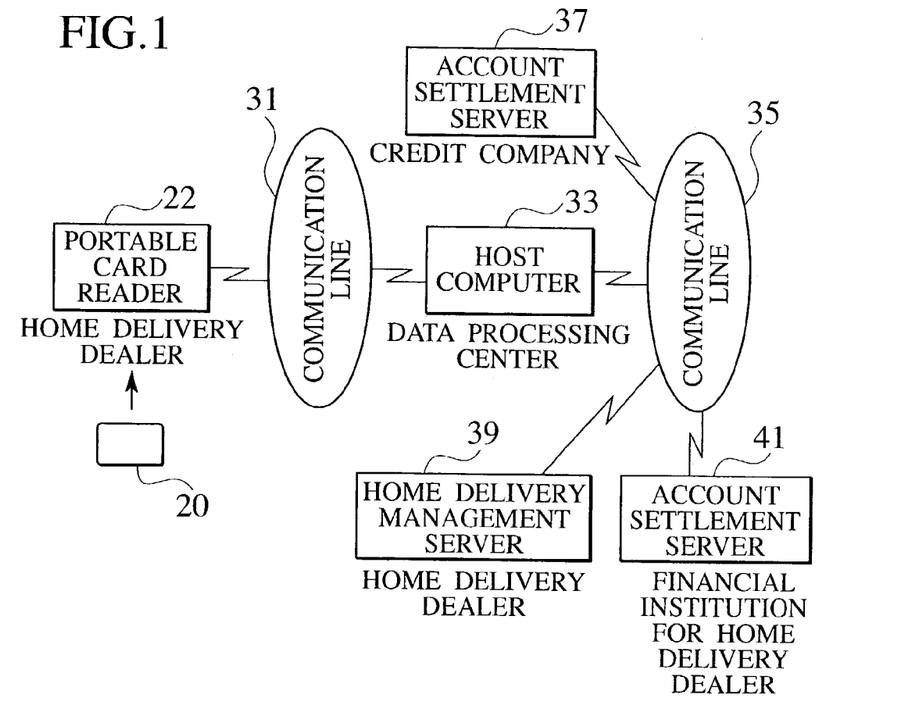
FIG. 1 is an overall conceptual diagram showing a card settlement system according to the present invention.

FIG. 1 is an overall conceptual diagram showing a preferred card settlement system according to this invention. Note that, in the card settlement system, a service dealer is a home delivery dealer, and a detailed explanation will be given by using, as an example, an charge-on-delivery service wherein a consumer at the destination who has received baggage pays a home delivery charge to a home delivery dealer.

As shown in FIG. 1, a portable card reader 22, which is carried by a home delivery dealer who provides for a consumer a distribution or transportation associated service, can be connected to a communication line 31 such as a special radio communication line. One of the communication interfaces (not shown) of a host computer 33 provided in a data processing center is also connected to the communication line 31. Further, the other communication interface (not shown) of the host computer 33 is connected to a communication line 35, such as a telephone line or the Internet. In addition, an account settlement server 37 provided in a credit company that serves as an account settlement institution, a service management server 39 provided in the home delivery dealer, and an account settlement server 41 provided in a financial institution with which the home delivery dealer has concluded an account settlement contract are connected to the communication line.

Figure 2:
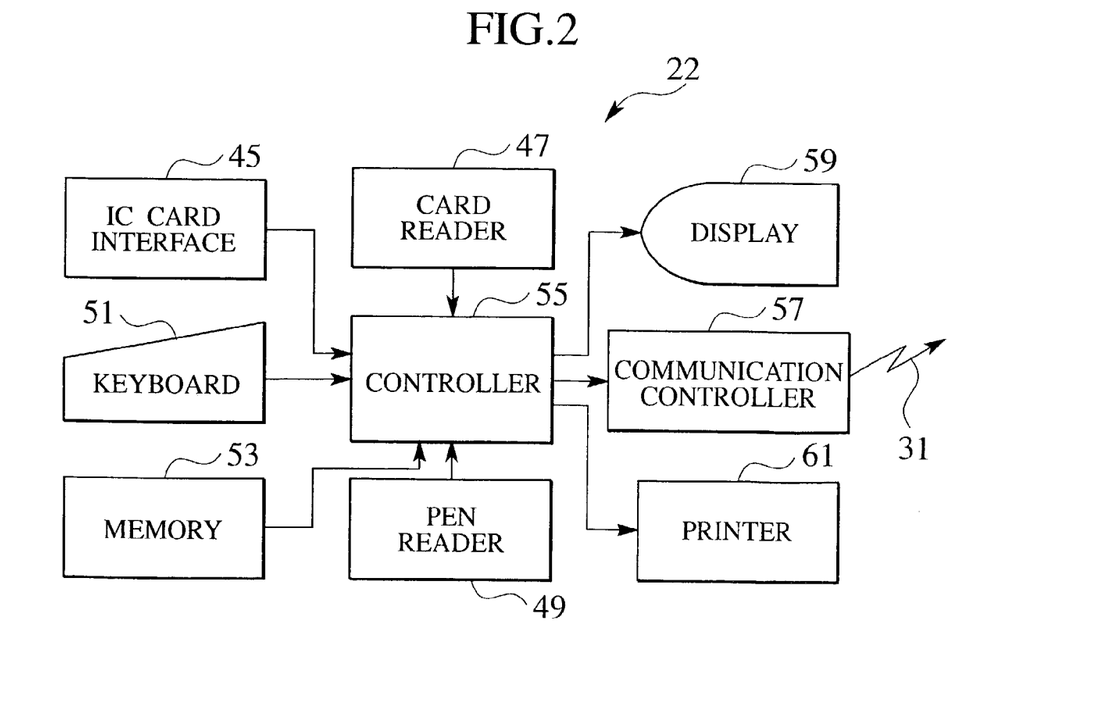
FIG. 2 is a block diagram showing a portable card reader 22.

FIG. 2 is a block diagram showing the portable card reader 22.

As shown in FIG. 2, the portable card reader 22 comprises: an I/F(interface) 45, a card reader 47, a pen reader 49, a keyboard 51, a memory 53, a controller 55, a communication processor 57, a display device 59 and a printer 61.

An IC card used for electronic money can be connected to the IC card I/F(interface) 45. The card reader 47 reads an authentication number, a valid period and the name of a credit company that are recorded on a credit card as magnetic data. The pen reader 49 scans a bar code written on a baggage tag, for example, to read an inquiry number. The keyboard 51 is used to enter a service charge, an authentication number and service identification information. The memory 53, in advance, memorizes a terminal number, inherent to each portable card reader, and includes an internal RAM for storing control data. The controller 55, which internally includes a timer for counting days and hours, controls the individual sections provided in the portable card reader. The communication processor 57 exchanges data with the host computer 33 through the communication line 31. The display device 59 is used display messages and input contents. The printer 61 prints a receipt when a card settlement is completed.

By turning on a power switch(not shown) provided in the portable card reader 22, the controller 55 reads a control program from the memory 53, and displays, for example, an operating guidance on the display device 59. When a home delivery dealer passes a credit card through the card reader 47, in accordance with the operating guidance, card data are read, a service charge and service identification information are entered at the keyboard 51, the inquiry number is read by scanning the bar code using the pen reader 49, and the authentication number is entered at the keyboard 51. Then, the terminal identification number for the portable card reader 22, which is stored in advance in the memory 53, is read, and the authentication number and the valid period, the service charge, the service identification number, the inquiry number and the authentication number are grouped together as a set of collected terminal data. The collected terminal data are transmitted from the communication processor 57, through the communication line 31, to the host computer 33 provided in the data processing center. When usage enabling data are received from the host computer 33 through the communication processor 57, the printer 61 prints a receipt on which the service inquiry number, the name of the credit company and the service charge etc. are written.

Figure 3:
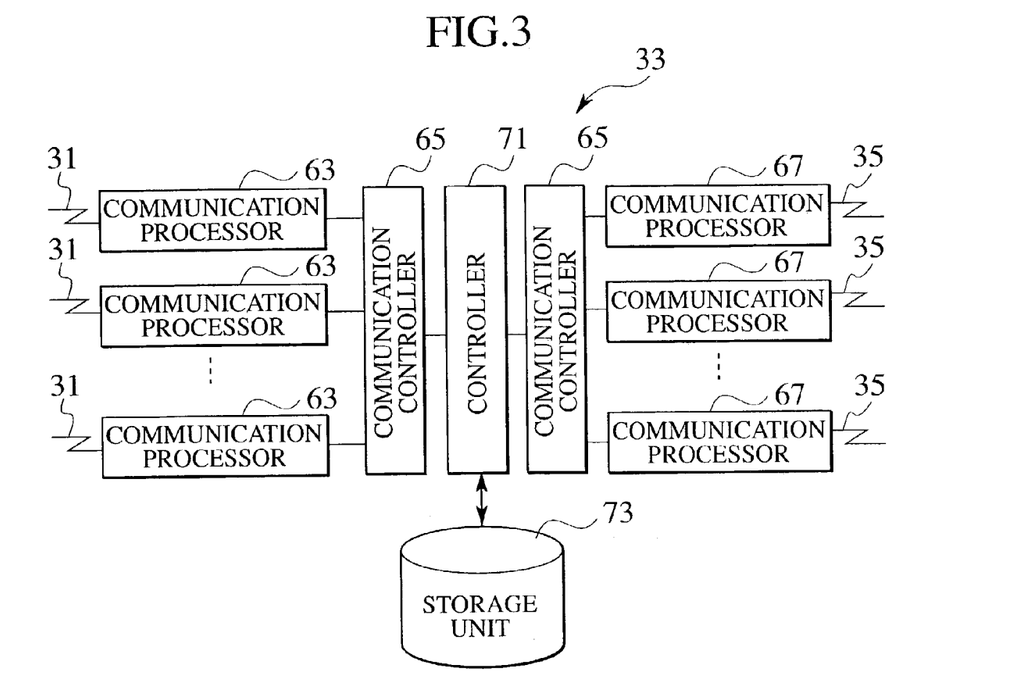
FIG. 3 is a block diagram showing a host computer 33.

FIG. 3 is a block diagram showing the host computer 33.

As shown in FIG. 3, the host computer 33 comprises: communication processors 63, a communication controller 65, communication processors 67, a communication controller 69, a controller 71 and a storage unit 73.

The communication processor 63 exchanges data with a plurality of portable card readers 22 through a plurality of communication lines 31. The communication controller 65 controls the multiple communication processors 63. The communication processors 67 exchange data with a plurality of servers 37, 39 and 41 through a plurality of communication lines 35. The communication controller 69 controls the multiple communication processors 67. The controller 71 internally includes a timer for counting days and hours, and controls the individual sections provided in the host computer. And the storage unit 73 stores, as a database, transaction data, card data and terminal data.

Figure 4:
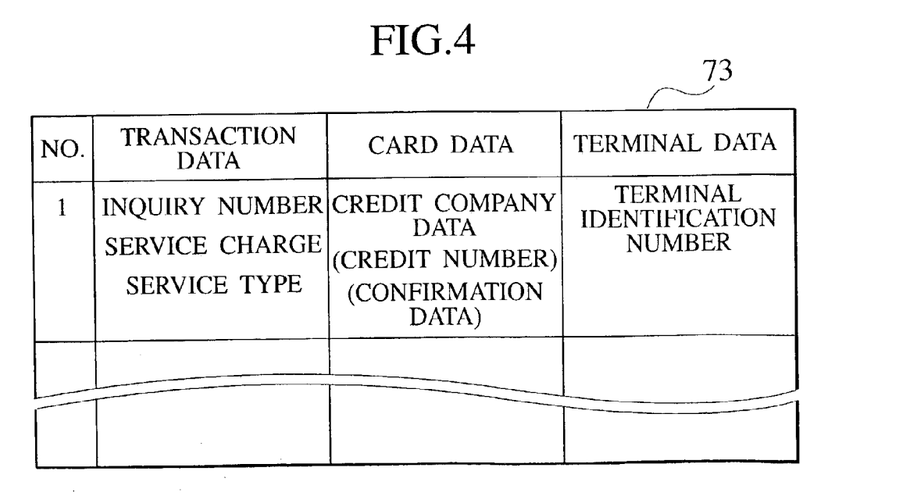
FIG. 4 is a diagram showing the contents stored in a storage unit 73 provided in the host computer 33.

FIG. 4 is a diagram showing the contents stored in the storage unit 73 provided in the host computer 33. As shown in FIG. 4, in the database stored in the storage unit 73, the inquiry number, which represents a service management number, and the service charge and the service type are stored as transaction data, credit company data and a card number(stored temporarily) are stored as card data, and the terminal identification number of the portable card number distributed to the home delivery dealer is stored as terminal data.

When the collected terminal data are received from the portable card reader 22, through the communication line 31 to the communication processor 63, the controller 71 stores the collected terminal data in the database of the storage unit 73, and transmits a credit inquiry request, to which the authentication number of the consumer and the valid period are added, through the communication line 35 from the communication processor 67 to the account settlement server 37 provided in the credit company.

When confirmation data are received from the account settling server 37, provided in the credit company, by the communication processor 67, the controller 71 stores as card data corresponding to the inquiry number in the database, the usage enabling data or usage disabling data included in the confirmation data and transmits the confirmation data from the communication processor 63 to the portable card reader 22 through the communication line 31.

At the same time, the controller 71 deletes the authentication number of the credit card stored in the database provided in the storage unit 73. Since the authentication number for the credit card temporarily stored in the storage unit 73 is deleted, the leakage of important personal data can be prevented.

Furthermore, when a provided time for the transfer of the contents of the database is reached, which time is arranged by the credit company and the home delivery dealer, the controller 71 transmits the contents stored in the database in the storage unit 73 from the communication processor 67 to the service management server 39 provided in the home delivery dealer through the communication line 35. The controller 71 then reads the card data from the database of the storage unit 73. When the usage enabling data are included in the confirmation data, the controller 71 reads a service charge included in the transaction data, subtracts a credit commission from the service charge, and transmits the obtained value (A) to the account settlement server 41 provided in a financial institution with which the home delivery dealer concludes an account settlement contract.

Figure 5:
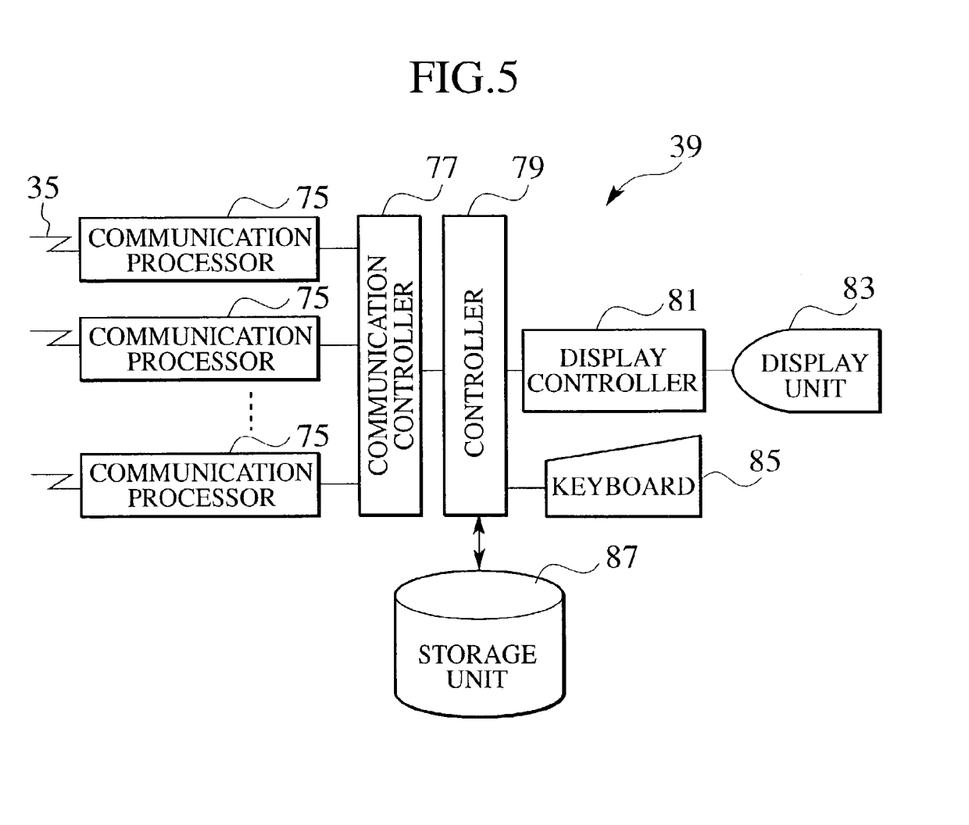
FIG. 5 is a block diagram showing a home delivery management server 39.

FIG. 5 is a block diagram showing the home delivery management server 39.

As shown in FIG. 5, the service management server 39 comprises communication processors 75, a communication controller 77, a controller 79, a display controller 81, a display unit 83, a keyboard 85 and a storage unit 87.

The communication processors 75 exchange data through the multiple communication lines 35 with the host computer 33 or the account settlement server 41 of a financial institution with which a contract is concluded. The communication controller 77 controls these communication processors 75. The controller 79, which has an internal timer for counting days and hours, controls the individual sections provided in the service management server 39. The display controller 81 displays, on the display unit 83, the data contents exchanged with the host computer 33 or the account settlement server 41 and the contents stored in the storage unit 87. The keyboard 85 is used to enter character data. The storage unit 87 stores, as a database, transaction data, card data, terminal data and account data.

Figure 8:
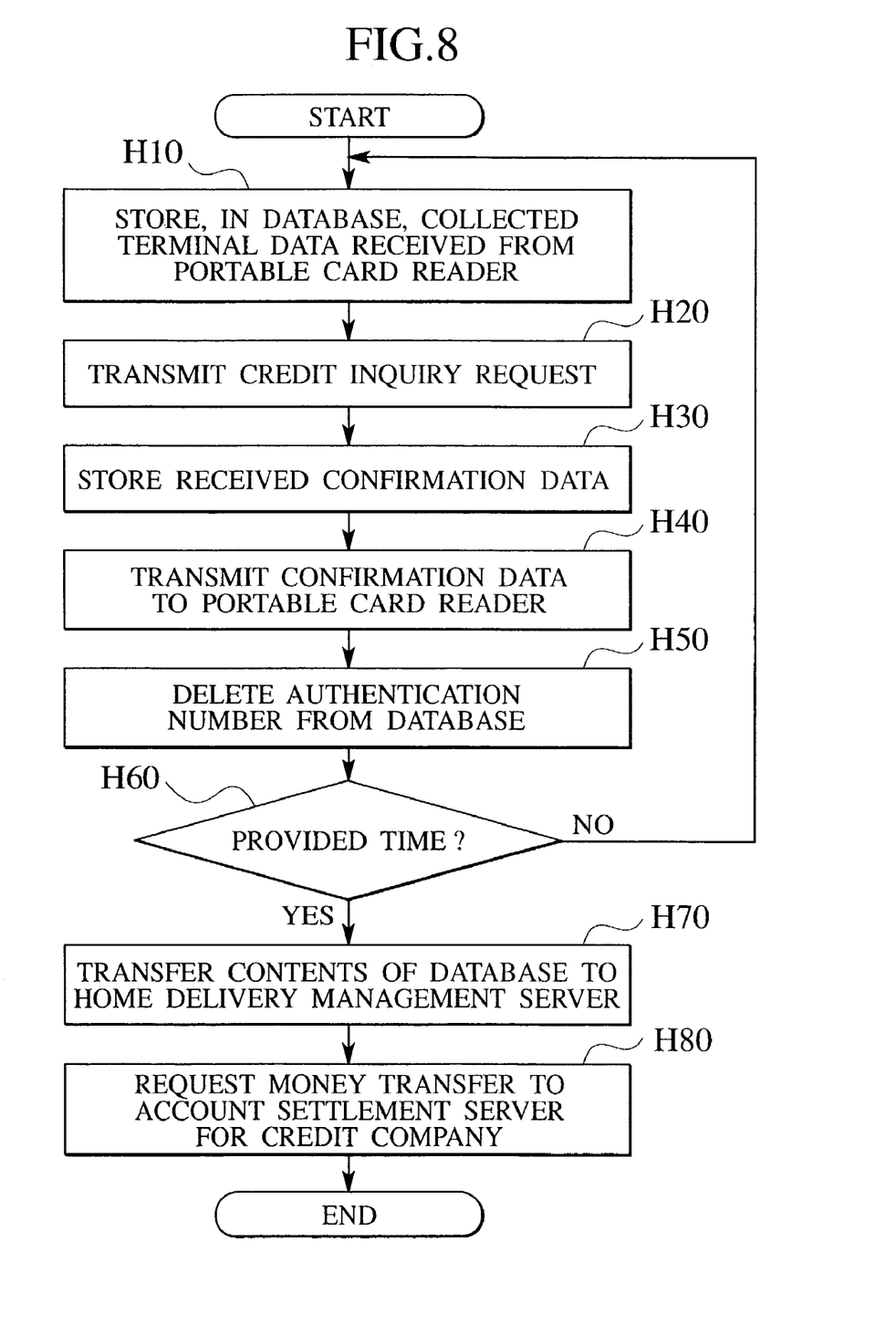
FIG. 8 is a flowchart showing the operation of the host computer 33.

In the database stored in the storage unit 87, as shown in FIG. 8, the inquiry number representing the service management number, the service charge and the service type etc. are stored as transaction data, the credit company data are stored as card data, the terminal identification number for the portable card reader distributed to the home delivery dealer is stored as terminal data, and the transaction contents and an amount deposited are stored as account data.

When the contents of the database are received from the host computer 33 through the communication processor 75, the controller 79 stores the received data in the database in the storage unit 87. When a provided money transfer completed time, determined by the credit company and the home delivery dealer, is reached, an account data inquiry request is transmitted to the account settlement server 41 of a financial institution with which the home delivery dealer concludes an account settlement contract. Then, the account data received from the account settlement server 41 of the financial institution are stored in correlation with the inquiry number stored in the database in the storage unit 87. Then, when the service charge (A) is received from the credit company, in accordance with the account data corresponding to the inquiry number stored in the database, the controller 87 reads the amount deposited (A) in the account data in the database, and transmits a money value (B), obtained by subtracting a delivery fee from the amount deposited (A), to the account settlement server 43 provided in the financial institution with which the vendor concludes an account settlement contract.

Figure 7:
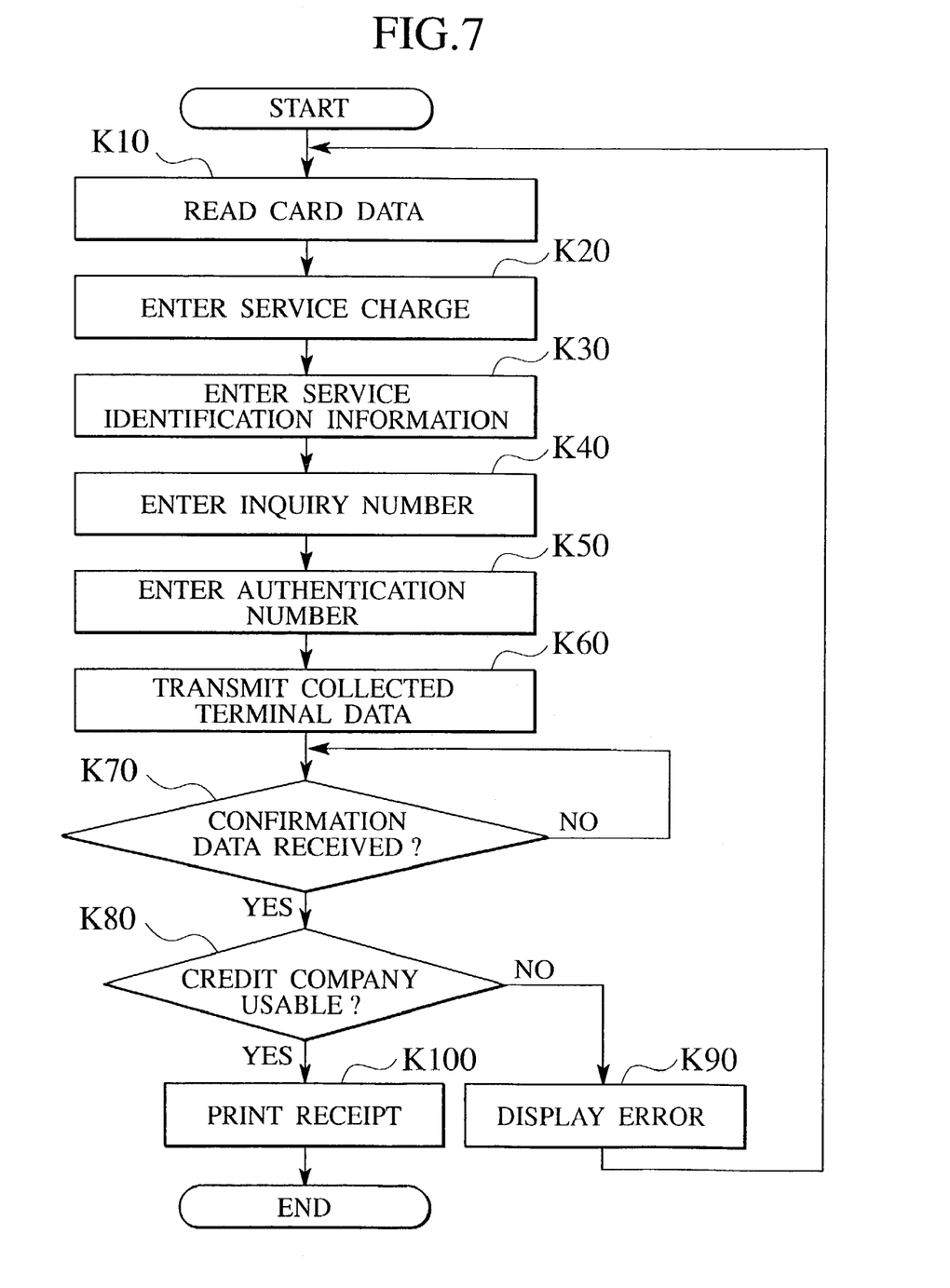
FIG. 7 is a flowchart showing the operation of the portable card reader 22.
Figure 9:
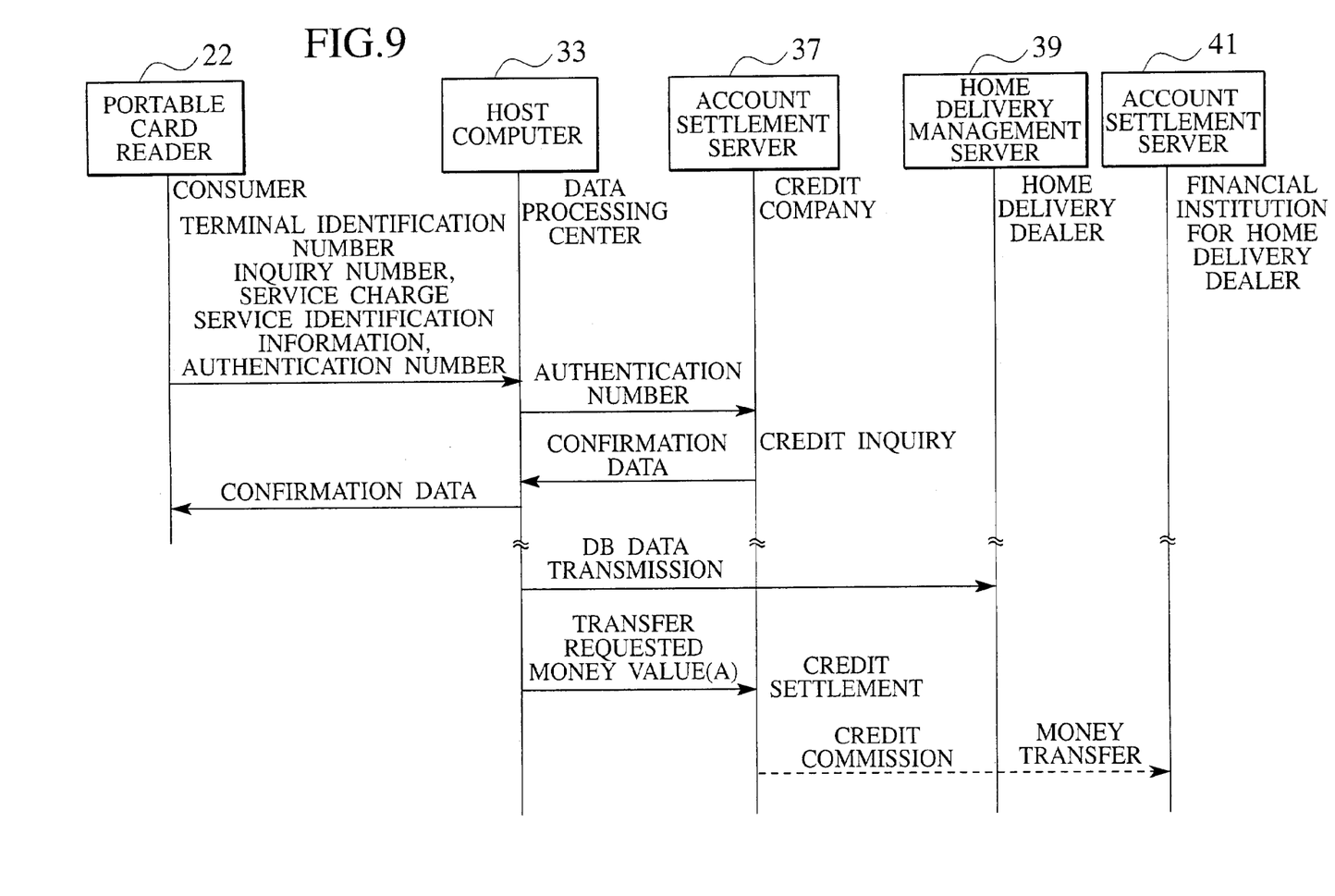
FIG. 9 is a diagram showing the sequential operation of a card settlement system for a home delivery service according to the present invention.

The operation of the card settlement system for a home delivery according to the present invention will now be described while referring to the flowcharts in FIGS. 7 and 8 and the sequence diagram in FIG. 9. Note that the flowchart for the portable card reader in FIG. 7 is stored in the controller 55 as a program, and that the flowchart for the host computer in FIG. 8 is stored in the controller 71 as a program.

The home delivery dealer concludes in advance a membership contract with a plurality of credit companies.

Further, assume that a consumer(a destination) issues an order for a specific product to a vendor, and transfers in advance the price of this product to a financial institution of which the vendor is a member. Then, the baggage is transferred from the vendor to a home delivery dealer, who in turn delivers the baggage to the home of the consumer.

Then, when the consumer receives the baggage from the home delivery dealer, the consumer hands to the home delivery dealer his or her credit card of a credit company with which the home delivery dealer has concluded a membership contract.

The home delivery dealer inserts the credit card 20 into the card reader 47 on the spot, which is provided in the portable card reader 22 carried by the home delivery dealer, to read the data recorded on the card.

In FIG. 7, at step K10, the card reader 47 reads, from the credit card 20, card data, such as the authentication number and the valid period, to identify a member, and makes the controller 55 to temporarily store the card data in the RAM internally provided in the memory 53.

Since at step K20 the home delivery dealer enters a charge-on-delivery service charge at the keyboard 51, the controller 55 temporarily stores the service charge in the RAM internally provided in the memory 53.

Since at step K30 the home delivery dealer enters, at the keyboard 51, service identification information to identify a service charge, such as a transportation fee, the controller 55 temporarily stores the service identification information in the RAM internally provided in the memory 53.

Since at step K40 the home delivery dealer scans a bar code written on part of a tag using the pen reader 49 and obtains a service inquiry number, the controller 55 temporarily stores the inquiry number in the RAM internally provided in the memory 53.

Since at step K50 the home delivery dealer enters at the keyboard 51 an authentication number indicated on the card 20, the controller 55 temporarily stores the authentication number in the RAM internally provided in the memory 53.

At step K60, the controller 55 reads the terminal identification number for the portable card reader 22 stored in the memory 53 in advance, and also reads the card data, such as the authentication number and the valid period, and the service charge, the service identification information, the inquiry number, and the authentication number, all of which are temporarily stored in the internal RAM. The controller 55 groups these data together as a set of collected terminal data, and transmits this data set through the communication line 31 to the host computer 33 provided in the data processing center.

Figure 6:
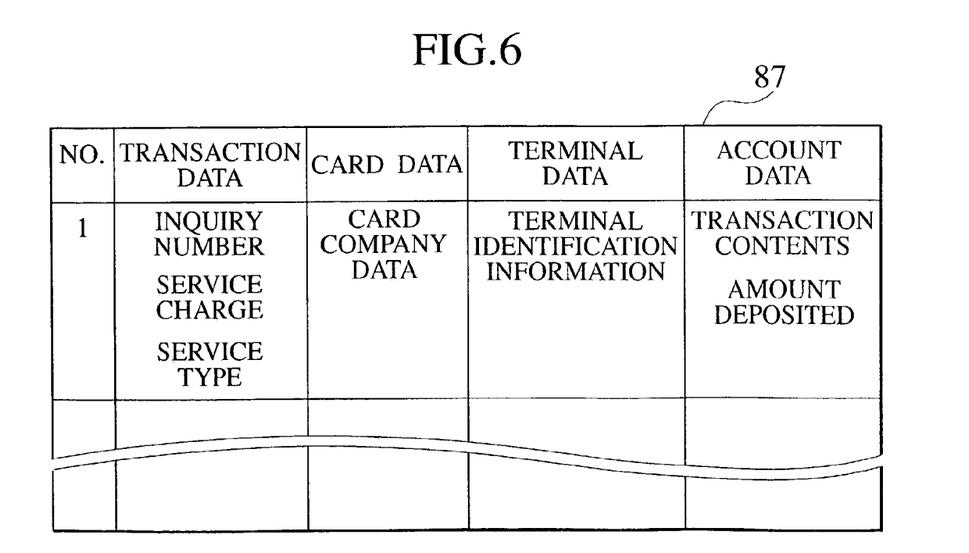
FIG. 6 is a diagram showing the contents stored in a storage unit 87 provided in the home delivery management server 39.

Referring to FIG. 10, upon receiving the collected terminal data from the portable card reader 22 through the communication line 31, at step H10, the controller 71 of the host computer 33 stores the collected terminal data in the database of the storage unit 73, as shown in FIG. 6.

At step H20, a credit inquiry request, together with the authentication number for the consumer and the valid period, is transmitted through the communication line 35 to the account settlement server 37 provided in the credit company.

Upon receiving the credit inquiry request from the host computer 33, the account settlement server 37 of the credit company compares, with the authentication number provided in the consumer, the authentication number and the valid period that are added to the credit inquiry request, and determines the validity of a predetermined credit card stored in the internally provided database(not shown). Then, the account settlement server 37 determines whether the consumer is currently maintaining a credit contract with the credit company and is still permitted to use the credit card.

When the credit contract with the consumer is effective, the account settlement server 37 generates confirmation data, including the usage enabling data. On the other hand, when the credit contract with the consumer is not effective, the account settlement server 37 generates confirmation data(the result of the credit inquiry) including usage disabling data. The account settlement server 37 then transmits the obtained confirmation data to the host computer 33.

Upon receiving the confirmation data from the account settlement server 37 provided in the credit company, at step H30 the controller 71 of the host computer 33 stores, as card data corresponding to the inquiry number in the database, the usage enabling data or the usage disabling data included in the confirmation data.

At step H40, the host computer 33 transmits the confirmation data through the communication line 31 to the portable card reader 22. At the same time, at step H50, the controller 71 deletes the authentication number for the credit card stored in the database in the storage unit 73, and advances to step H60. As a result, since the authentication number of the credit card temporarily stored in the storage unit 73 is deleted after the result of the credit inquiry is obtained, the leakage of important personal data for the consumer can be prevented.

As is described above, the host computer 33 in the data processing center receives, from the portable card reader 22 carried by the home delivery dealer through the communication line 31, the authentication number of the consumer and the data for a transportation fee required for home delivery, and transmits the authentication number to the account settlement server of the credit company that settles the account for the consumer. When the host computer 33 receives, from the account settlement server 37 of the credit company, confirmation data indicating that the credit company is usable or unusable, the host computer 33 transmits the confirmation data to the portable card reader 22 so that the credit inquiry for the card read by the portable card reader can be issued.

Referring back to FIG. 7, at step K70, the portable card reader 22 waits for the reception of the confirmation data from the host computer 33. The portable card reader 22 that has received the confirmation data from the host computer 33 advances to step K80, and employs the confirmation data to determine whether the credit company can be employed. That is, when usage enabling data is included in the confirmation data, the credit company is usable, and the program control advances to step K100. When the usage disabling data is included in the confirmation data, the credit company is unusable, and the program control is shifted to step K90.

When the credit company is unusable, at step K90 the controller 55 reads, from the memory 53, message data indicating that "this credit company is unusable", and displays an error on the display unit 59.

At the same time, the controller 55 deletes the card data, such as the authentication number for the consumer and the valid period, temporarily stored in the internal RAM of the memory 53, and returns to step K10 to repeat the above processing.

On the other hand, when the credit company is usable, at step K100 the controller 55 reads, from the memory 53, the service inquiry number, the name of the credit company and the service charge. Then, the controller 55 generates reception data indicating that the setting for the charge-on-delivery service charge has been completed, while adding the day and time read from the timer as the delivery day and time, and outputs the reception data to the printer 61, which then prints a receipt.

At the same time, the controller 55 deletes the card data, such as the authentication number for the consumer and the valid period, that are temporarily stored in the internal RAM of the memory 52, and terminates the processing by the portable card reader 22. The home delivery dealer cuts off the receipt printed by the printer 61 and hands it to the consumer.

As is described above, the authentication number for the consumer is read from the credit card issued by the credit company that settles the account for the consumer; the service charge data for the charge-on-delivery service for a home delivery is entered; the authentication number for the consumer and the service charge data for the charge-on-delivery service are transmitted through the communication line to the host computer 33 of the data processing center; and, when the data indicating the credit company is usable are received from the host computer 33 of the data processing center, a receipt indicating that the transaction for the charge-on-delivery service has been completed is printed by the printer 61. As a result, the transportation fee for the baggage received through home delivery can be settled using the credit card.

Therefore, the consumer who ordered the product need not assemble cash in advance to pay the transportation fee for the delivered baggage (product).

Furthermore, in the portable card reader 22, since the authentication number for the credit card that is temporarily stored in the storage unit 73 is deleted after the result of the credit inquiry is obtained, the leakage of important personal data for the consumer can be prevented.

At H60, the controller 71 of the host computer 33 provided in the data processing center determines whether the time read from the timer reaches the provided time for the transfer of the contents of the database, which time is arranged by the credit company and the home delivery dealer. Until the provided time is reached, program control returns to step H10 and the above described process is repeated.

When the provided time is reached, at step H70, the contents stored in the database in the storage unit 73 are transmitted through the communication line 35 to the home delivery management server 39 provided in the home delivery dealer.

At step H80 the controller 71 reads the card data from the database in the storage unit 73, and determines whether the usage enabling data are included in the confirmation data. When the usage enabling data are included, the controller 71 reads the service charge (transportation fee) included in the transaction data and transmits, to the account settlement server 41 provided in a financial institution that the home delivery dealer has concluded an account settlement contract, the money value (A) obtained by subtracting the credit commission from the transportation fee. The processing is thereafter terminated.

As a result, the credit commission is paid to the credit company by a determined payment date, and further, the transportation fee is paid. Furthermore, the money value (A) is paid by the credit company to the financial institution with which the home delivery dealer concludes an account settlement contract.

As is described above, when the host computer 33 provided in the data processing center receives, from the account settlement server of the credit company that settles an account for the consumer, the confirmation data indicating that the credit company is usable, the host computer 33 returns the service charge data. Further, the credit company transmits a request for payment of the service charge to the account settlement server 41 of the financial institution that settles an account for the home delivery dealer. As a result, the service charge can be settled by the credit company, and can be paid to the financial institution that settles the account for the home delivery dealer.

Further, the account settlement server 37 of the credit company that settles the account for the consumer transfers, to the financial institution that settles the account for the home delivery dealer, the money value (A) obtained by subtracting the transaction commission from the service charge. As a result, the credit company can obtain the commission for the settlement.

An explanation has been given for an example wherein the credit settlement is performed using the credit card issued by the credit company that is the account settlement institution that settles the account for the consumer. The account settlement institution for the consumer may be a financial institution, such as a bank. In this case, the consumer can employ a debit card issued by the financial institution to pay a service charge for the transportation service for the baggage received by home delivery. When the debit card is employed for payment, a PIN number registered in advance with the financial institution is entered.

Furthermore, as is described above, an explanation has been given for an example wherein the card settlement method is employed for a charge-on-delivery service, according to which, when baggage is delivered and received at the home of a consumer as the destination, the delivery fee is paid to the home delivery dealer. However, the present invention is not limited to this case, and can be applied for an advance payment service according to which a consumer pays a home delivery dealer a delivery fee for baggage when he or she hands it to the dealer, a moving service according to which baggage, such as household goods, is transported, or a charter service according to which, for example, a truck is reserved for a predetermined period of time.

In addition, as an accounts settlement service according to which a bill is issued for the expenses associated with distribution or transportation to settle an account, the card settlement method can also be employed for a delivery fee, a charge-on-delivery service fee, an insurance fee, and an advance, such as a packing bag usage fee, a packing expense, distribution center rent or a data system usage fee.

Furthermore, other than the credit card or the debit card described above, a fingerprint or a retina inherent to an individual can be employed as an authentication medium. When image data have been obtained for a fingerprint or a retina and have been registered in advance in the account settlement server of an account settlement institution, and when the portable card reader 22 reads the image data and the settling server performs an authentication process, the individual can be identified.

INDUSTRIAL APPLICABILITY

According to the present invention, to provide a consumer with a distribution or transportation associated service, the data for an account settlement card used for settling an account for the consumer are read by the portable card reader, and the obtained contents are transmitted through the radio communication line to the account settlement institution that settles the account. Upon receiving the result of the credit inquiry for the account settlement card from the account settlement institution, the service charge is settled. In this manner, the charge for the distribution or transportation associated service can be settled by using the card.

As a result, a consumer can hand baggage to or receive baggage from a home delivery dealer without having to prepare in advance to pay cash for the distribution or transportation service associated with the home delivery of the baggage. Thus, the convenience and the safety of the service can be improved for the consumer.

Further, the portable card reader reads data from the account settlement card issued by the account settlement institution, and transmits the data for the account settlement card and the service charge data to the account settlement institution through the radio communication line. Then, when the account settlement institution receives the data for the account settlement card and the service charge data from the portable card reader through the radio communication line, the account settlement institution issues a credit inquiry for the consumer based on the data received for the account settlement card and predetermined data used to determine the validity of an account settlement card. The account settlement institution settles the service charge based on the result of the credit inquiry obtained upon the submission of the credit inquiry and the received service charge data, and transmits the result of the credit inquiry through the radio communication line to the portable card reader. The portable card reader receives the result of the credit inquiry from the account settlement institution through the radio communication line, and issues a receipt in accordance with the received result of the credit inquiry information and the service charge data. Therefore, by using the card, the charge for the distribution or transportation associated service can be settled.

As a result, a consumer can hand baggage to or receive baggage from a home delivery dealer without having to prepare in advance to pay cash for the distribution or transportation of baggage associated with the home delivery service. Thus, the convenience and the safety of the service can be improved for the consumer.

As is described above, the card settlement method according to the invention for a distribution or transportation service associated charge is effective for an account settlement system wherein data is exchanged through a communication line between a portable card reader, carried by the service dealer who provides a distribution or transportation related service for a consumer, and an account settlement institution for settling the charge for the service. This card settlement method is especially appropriate for the employment of a card used to settle a charge for a distribution or transportation associated service.

What is claimed is:

1. A card settlement method, for settling a charge for a distribution or transportation associated service, comprising:
   exchanging data through a radio communication line between a portable card reader carried by a service dealer who provides the service and a host computer;
   wherein the portable card reader:
      reads card data from an accounting card used by the consumer at the destination of the distribution or the transportation; and
      transmits the card data, an inquiry number that represents a service management number, and service charge data through the radio communication line to the host computer,
   the host computer:
      receives the card data, the inquiry number, and the service charge data from the portable card reader;
      transmits a credit inquiry request with the card data to an account settlement server that settles accounts for the consumer;
      receives the result of the credit inquiry about the accounting card regarding the card data from the account settlement server; and
      transmits the result of the credit inquiry through the radio communication line to the portable card reader,
   the portable card reader:
      receives the result of the credit inquiry from the host computer through the radio communication line; and
      issues a receipt based on the result of the credit inquiry and the service charge data,
   the host computer:
      transmits the service charge data to the account settlement server; the account settlement server:
      transmits a money value calculated by subtracting a commission from the service charge to an account server that settles accounts for the service dealer;
   the host computer:
      transmits each inquiry number and each service charge data regarding each inquiry number to a service management server associated with the service dealer.

2. The card settlement method according to claim 1, wherein after transmitting the result of the credit inquiry to the portable card reader, the host computer deletes the authentication number included in the card data.

3. The card settlement method according to claim 1, wherein the accounting card is a credit card issued by a credit company or a debit card issued by a financial institution.

4. A card settlement system for settling a charge for a distribution or transportation associated service, comprising:
   a portable card reader carried by a service dealer who provides the service, and a host computer configured to exchange data for the portable card reader through a radio communication line,
   wherein the portable card reader comprises:
      a card reader configured to read card data from an accounting card used by the consumer at the destination of the distribution or the transportation; and
      a communication controller configured to transmit the card data, an inquiry number that represents a service management number, and service charge data through the radio communication line to the host computer;
      a communication processor configured to receive the result of the credit inquiry from the host computer through the radio communication line; and
      an issuing unit configured to issue a receipt based on the result of the credit inquiry and the service charge data, and
   the host computer comprises:
      a first communication processor configured to receive the card data, the inquiry number, and the service charge data from the portable card reader;
      a second communication processor configured to transmit a credit inquiry request with the card data to an account settlement server that settles accounts for the consumer;
a third communication processor configured to receive the result of the credit inquiry about the accounting card regarding the card data from the account settlement server;
a fourth communication processor configured to transmit the result of the credit inquiry through the radio communication line to the portable card reader;
a fifth communication processor configured to transmit the service charge data to the account settlement server; and
a sixth communication processor configured to transmit the inquiry number and the service charge data to a service management server associated with the service dealer;

the account settlement server comprises:
a communication processor configured to transmit a money value calculated by subtracting a commission from the service charge to an account server that settles accounts for the service dealer.

5. The card settlement system according to claim 4, wherein the host computer further comprises:
a deletion unit configured to, after transmitting the result of the credit inquiry to the portable card reader, delete the authentication number included in the card data.

6. The card settlement system according to claim 4, wherein the accounting card is a credit card issued by a credit card company or a debit card issued by a financial institution.

* * * * *